(12) United States Patent
Gottlieb et al.

(10) Patent No.: US 10,025,394 B2
(45) Date of Patent: *Jul. 17, 2018

(54) FINGERNAIL SYSTEM FOR USE WITH CAPACITIVE TOUCHSCREENS

(71) Applicant: Stacey Gottlieb, Scottsdale, AZ (US)

(72) Inventors: Stacey Gottlieb, Scottsdale, AZ (US); Floyd Chapman, Arlington, VA (US)

(73) Assignee: Stacey Gottlieb, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,924

(22) Filed: Aug. 8, 2017

(65) Prior Publication Data

US 2017/0357331 A1    Dec. 14, 2017

Related U.S. Application Data

(63) Continuation of application No. 14/775,409, filed as application No. PCT/US2014/028995 on Mar. 14, 2014, now Pat. No. 9,753,551.

(Continued)

(51) Int. Cl.
*G06F 3/045* (2006.01)
*G06F 3/033* (2013.01)
(Continued)

(52) U.S. Cl.
CPC ............. *G06F 3/033* (2013.01); *G06F 3/014* (2013.01); *G06F 3/03545* (2013.01); *G06F 3/044* (2013.01); *G06F 2203/0331* (2013.01)

(58) Field of Classification Search
CPC ...... G06F 3/033; G06F 3/014; G06F 3/03545; G06F 3/044; G06F 2203/0331
See application file for complete search history.

(56) References Cited

U.S. PATENT DOCUMENTS 4,509,990 A    4/1985 Vasudev
5,035,926 A    7/1991 Jonas et al.
(Continued)

FOREIGN PATENT DOCUMENTS

KR    20130007881    1/2013
WO    199213328    8/1992
(Continued)

OTHER PUBLICATIONS

English Translation for KR20130007881 A, PatBase, translated Apr. 24, 2013.

(Continued)

*Primary Examiner* — Vijay Shankar
(74) *Attorney, Agent, or Firm* — Wiley Rein LLP

(57) ABSTRACT

Capacitive fingernail systems adapted to fit on a fingernail and for use with a capacitive touchscreen, as well as methods of creating such systems, are disclosed. The capacitive fingernail system may include a conductive base layer secured to the fingernail, a conductive upper layer, and a dielectric medium between the base and upper layers. The capacitive fingernail system stores an amount of charge that is sufficient to permit the fingernail to successfully interact with a capacitive touchscreen. Also disclosed is a fingernail stylus for use with a capacitive touchscreen, having a shaped conductive device that is pre-formed so that it can be secured to a curvature of a fingernail. The shaped conductive surface transfers an effective amount of electrical energy to successfully interact with a capacitive touchscreen. Preferably, the capacitive fingernail systems are sized and shaped to fit unobtrusively on a fingernail without interfering with everyday activity.

19 Claims, 3 Drawing Sheets

Related U.S. Application Data

(60) Provisional application No. 61/793,834, filed on Mar. 15, 2013.

(51) Int. Cl.
*G06F 3/0354* (2013.01)
*G06F 3/044* (2006.01)
*G06F 3/01* (2006.01)

(56) References Cited

U.S. PATENT DOCUMENTS

| | | | |
|---|---|---|---|
| 5,973,382 A | 10/1999 | Burgener et al. | |
| 6,080,414 A | 6/2000 | Smith, III et al. | |
| 6,123,931 A | 9/2000 | Ellingson et al. | |
| 6,136,300 A | 10/2000 | Ellingson et al. | |
| 6,156,325 A | 12/2000 | Farer et al. | |
| 6,306,375 B1 | 10/2001 | Ellingson et al. | |
| 6,391,938 B1 | 5/2002 | Lilley | |
| 6,555,096 B2 | 4/2003 | Carrion et al. | |
| 6,599,958 B2 | 7/2003 | Lilley | |
| 6,626,598 B2 | 9/2003 | Schneider | |
| 6,656,483 B1 | 12/2003 | Farer et al. | |
| 6,704,188 B2 | 3/2004 | Zheng et al. | |
| 6,803,394 B2 | 10/2004 | Lilley et al. | |
| 6,912,113 B2 | 6/2005 | Kumar et al. | |
| 7,169,107 B2 | 1/2007 | Jersey-Willuhn et al. | |
| 7,255,924 B2 | 8/2007 | Long et al. | |
| 7,295,419 B2 | 11/2007 | Chow et al. | |
| 7,389,580 B2 | 6/2008 | Jenson et al. | |
| 7,428,138 B2 | 9/2008 | Mosley et al. | |
| 7,663,607 B2 | 2/2010 | Hotelling et al. | |
| 7,672,114 B1 | 3/2010 | Long et al. | |
| 8,013,371 B2 | 9/2011 | Zheng et al. | |
| 8,169,422 B2 | 5/2012 | Flachsbart | |
| 8,243,050 B2 | 8/2012 | Adkins | |
| 8,730,194 B2 | 5/2014 | Vellanki | |
| 8,766,954 B2 | 7/2014 | Vuppu et al. | |
| 8,875,315 B2 | 11/2014 | Baacke | |
| 8,970,559 B1 | 3/2015 | McVickar et al. | |
| 9,753,551 B2 * | 9/2017 | Gottlieb | G06F 3/033 |
| 2002/0102222 A1 | 8/2002 | Carrion et al. | |
| 2005/0093835 A1 | 5/2005 | Mortarelli | |
| 2005/0219788 A1 | 10/2005 | Chow et al. | |
| 2006/0097991 A1 | 5/2006 | Hotelling et al. | |
| 2007/0013681 A1 | 1/2007 | Chou | |
| 2007/0145525 A1 | 6/2007 | Wang et al. | |
| 2008/0089012 A1 | 4/2008 | Kon et al. | |
| 2008/0297493 A1 | 12/2008 | Adkins | |
| 2009/0262637 A1 | 10/2009 | Badaye et al. | |
| 2009/0278818 A1 | 11/2009 | DiNozzi et al. | |
| 2010/0039392 A1 | 2/2010 | Pratt et al. | |
| 2010/0110014 A1 | 5/2010 | Dayhoff | |
| 2011/0007035 A1 | 1/2011 | Shai | |
| 2011/0045272 A1 | 2/2011 | Allemand | |
| 2012/0096620 A1 | 4/2012 | Baacke | |
| 2012/0154340 A1 | 6/2012 | Vuppu et al. | |
| 2012/0308806 A1 | 12/2012 | Leto et al. | |
| 2013/0025016 A1 | 1/2013 | Koffi et al. | |
| 2013/0207900 A1 | 8/2013 | Harooni | |
| 2014/0041677 A1 | 2/2014 | Yumoto et al. | |

FOREIGN PATENT DOCUMENTS

| | | |
|---|---|---|
| WO | 2009119963 | 10/2009 |
| WO | 2011011304 | 1/2011 |
| WO | 2012137963 | 10/2012 |
| WO | 2014016453 | 1/2014 |

OTHER PUBLICATIONS

International Search Report and Written Opinion for PCT/US14/28995, dated Aug. 27, 2014.

Supplemental European Search Report for PCT/US2014/028995, dated Sep. 28, 2016.

* cited by examiner

FINGERNAIL SYSTEM FOR USE WITH CAPACITIVE TOUCHSCREENS

CROSS-REFERENCE TO RELATED APPLICATIONS

This application is a continuation of U.S. application Ser. No. 14/775,409, filed 11 Sep. 2015, which is a national stage filing under 35 U.S.C. § 371 based upon international application no. PCT/US2014/028995, filed 14 Mar. 2014 and published on 18 Sep. 2014 under international publication no. WO 2014/144538, which claims priority to U.S. provisional application No. 61/793,834, filed 15 Mar. 2013. Each of the foregoing applications is hereby incorporated by reference as though fully set forth herein.

BACKGROUND OF THE INVENTION a. Field of the Invention

The present invention relates generally to methods and apparatus for data input, and, more particularly, to a method and apparatus for permitting manual input though use of a fingernail with a capacitive touchscreen.

b. Background Art

Many methods for manual input of data and commands to computers are in use today, but perhaps the most widely used system involves input of information using a capacitive sensing touchscreen (or simply "capacitive touchscreens") in combination with either a stylus or simply the user's fingers. Digital audio players, mobile phones, and tablet computers utilize capacitive sensing touchscreens to receive input from users. For example, computer tablets can be quickly manipulated using fingers. There are a variety of capacitive sensing technologies used in the touchscreens of today's consumer products. The present invention is designed to work with those systems that permit a conductor (such as a finger) to electrically interact with a capacitive touchscreen. While the details of the technology vary from system to system, generally speaking the human finger can be used as an input device in a variety of ways. For example, in one system, the finger can form a dynamic capacitor with the screen that permits the device to sense the location of the touch. In other systems, because the finger has conductive properties, it electrically interacts with the device to permit the device to determine the location of the touch.

Many professionals, however, have longer finger nails, which can pose a challenge for inputting information using capacitive touchscreens. Similarly, some users who have wide fingers may have a difficult time hitting the precise area on a screen which may be necessary to input a particular letter that may be displayed on a capacitive touchscreen, for example, the letter "d" as opposed to "s" or "f" which are located on either side in a QWERTY type keyboard. Using one's finger nail, however, generally is ineffective with capacitive touchscreens. A need in the art exists to help those persons who would prefer to use finger nails to interactive with a capacitive touchscreen.

BRIEF SUMMARY OF THE INVENTION

It is desirable to be able to provide a system that would permit the creation of a capacitive finger nail system that will effectively interact with a capacitive touchscreen. It is also desirable to provide a method of forming a capacitive element on a finger nail that will effectively interact with a capacitive touchscreen. Finally, it is desirable to provide a method of utilizing a fingernail capacitive system to engage a capacitive touchscreen.

Disclosed herein is a capacitive fingernail system adapted to fit on a fingernail having a conductive base layer that is secured to the fingernail; a dielectric medium on top of the conductive base layer; and a conductive top layer that is located on top of the dielectric medium. The capacitive fingernail system has the capacity to store an effective amount of charge to permit the fingernail to successfully interact with a capacitive touchscreen. Preferably, the dielectric medium is applied at a thickness that permits storage of enough capacitance to permit the fingernail to successfully interact with a capacitive touchscreen. The conductive base layer may be formed in a variety of ways, as one of ordinary skill in the capacitor arts would appreciate. For example, the conductive base layer may be formed using a metallic foil shaped to fit on a fingernail, or may be formed using conductive ink, or even may be formed using a polish that dries and/or is cured to form the conductive layer. Preferably, the conductive base layer is shaped to cover the fingernail, and is preferably shaped to cover at least a distal portion of the fingernail. In an alternative embodiment, the conductive base layer may be shaped to be located on a proximal portion of the fingernail, provided there is a conductive portion of the capacitive system that is located on a distal portion of the fingernail such that it can permit a wearer to successfully interact with a capacitive touchscreen. Similarly, the conductive top layer may be formed in a variety of ways, as one of ordinary skill in the capacitor arts would appreciate. For example, the conductive top layer may be formed using a metallic foil shaped to fit on a fingernail, or may be formed using conductive ink, or even may be formed using a polish that dries and/or is cured to form the conductive layer. Preferably, the conductive top layer is shaped to cover the fingernail, and is preferably shaped to cover at least a distal portion of the fingernail. In an alternative embodiment, the conductive top layer may be shaped to be located on a proximal portion of the fingernail, provided there is a conductive portion of the capacitive system that is located on a distal portion of the fingernail such that it can permit a wearer to successfully interact with a capacitive touchscreen. Optionally, one or more top coats may be applied to the capacitive fingernail system. Preferably the top coats are conductive such that they are capable of transferring sufficient electrical energy for the capacitive system to engage a capacitive touchscreen. Alternatively and/or additionally, optional non-conductive coatings may be applied provided at least a portion of the capacitive nail system located at the distal end of the nail remains exposed such that at least the distal portion of the system can transfer sufficient electrical energy for the capacitive system to engage a touchscreen. Preferably, at least one or more of the optional coatings dries and/or is cured to a hardness level so as to protect the conductive top layer. Preferably, each of the conductive layers is sufficiently flexible to permit the wearer to conduct everyday tasks that require fingernails to be flexed without damaging the capacitive nail system. Preferably the various coats described above are clear or at least translucent. Optionally, at least one of the coats described above is flesh toned and any coats that are applied on top of the flesh-toned coat are clear. Optionally, the one or more coats may be colored, tinted, opalescent, shimmering, translucent, metallic, and combinations thereof. Once a desired appearance is obtained, one or more clear coats may be applied consistent with the teachings above. Generally speaking, it is preferred that the overall thickness of the capacitive nail system be about the same or less than the thickness of a conventional artificial nail, and even more desirable that it be about the same or less than the thickness of a conventional coat of nail polish. Preferably the capacitive nail system is formed such that the overall thickness is less than about 0.05 inches, and more preferably, less than about 0.01 inches, and even more preferably, less than about 0.003 inches.

Also disclosed herein is a method of creating a capacitive system on a fingernail. A conductive base layer is formed on the fingernail, dielectric medium is applied on top of the conductive base layer, and a conductive top layer is formed on top of the dielectric medium. The amount of dielectric medium should be sufficient to store enough charge that permits the fingernail to successfully interact with a capacitive touchscreen. The step of securing a conductive base layer may comprise securing a conductive foil to the fingernail using an adhesive. In a preferred embodiment, the adhesive is conductive. Alternatively, the step of securing a conductive base layer may comprise forming a conductive base layer on the fingernail using conductive ink. The step of securing a conductive top layer may comprise securing a conductive foil to the fingernail using an adhesive, whereby the conductive foil covers at least a portion of the distal end of the fingernail. Alternatively, the step of securing a conductive top layer may comprise forming a conductive top layer on the fingernail using conductive ink. Optionally, one or more top coats are applied to protect the conductive top layer. Preferably the top coat is sufficiently conductive such that a sufficient charge can be transferred to and/or from the dielectric medium in order to provide useful input through the touchscreen.

Also disclosed herein is a method of creating a capacitive system on a fingernail, comprising the steps of: securing a capacitive device to the fingernail, said capacitive device having a first conductive contact and a second conductive contact; and applying a conductive top layer that is in electrical communication with the second conductive contact. The step of applying a conductive top layer may include securing a conductive foil to the fingernail using an adhesive and creating an electrical path between the conductive foil and the second conductive contact to ensuring that the conductive foil is in electrical communication with the second conductive contact. The step of creating an electrical path may be achieved by locating the conductive foil such that it makes physical contact with the second conductive contact. Alternatively, the step of creating an electrical path is achieved by applying a conductive medium that extends from the conductive foil to the second conductive contact. The method may further include the step of applying a conductive base layer on the fingernail such that the first conductive contact of the capacitive device is in electrical communication with the conductive base layer. Alternatively, the step of applying a conductive top layer may include applying a layer of conductive ink. Generally speaking, it is preferred that the overall thickness of the capacitive device be about the same or less than the thickness of a conventional artificial nail, and even more desirable that it be about the same or less than the thickness of a conventional coat of nail polish. Preferably, the overall thickness of the capacitive device is less than about 0.05 inches, and more preferably less than about 0.01 inches, even more preferably less than about 0.003 inches. Optionally, one or more top coats are applied to protect the conductive top layer. Preferably the top coat is sufficiently conductive such that an effective amount of charge can be transferred to or from the dielectric medium to permit useful input through a capacitive touchscreen using a fingernail.

Also disclosed is a method of creating a capacitive system on a fingernail, comprising: securing a capacitive device to the fingernail, wherein the capacitive device is capable of storing an effective amount of charge to permit the fingernail to successfully interact with a capacitive touchscreen, said fingernail having a top surface and an underside. The capacitive device may be secured to a top surface of the fingernail, or to the underside of the fingernail. The capacitive device may be secured to the fingernail as a fingernail extension, or a part thereof. Optionally, the method may include applying a conductive top layer that is in electrical communication with the second conductive contact. The conductive top layer may be positioned to cover at least a distal portion of the fingernail to permit the fingernail to interact with a capacitive touchscreen by transferring a sufficient charge to permit detection by a touchscreen. The step of applying a conductive top layer may include securing a conductive foil to the fingernail using an adhesive, whereby the conductive foil covers at least a portion of the distal end of the fingernail. Alternatively, the step of securing a conductive top layer may include forming a conductive top layer on the fingernail using conductive ink. Generally speaking, it is preferred that the overall thickness of the capacitive device be about the same or less than the thickness of a conventional artificial nail, and even more desirable that it be about the same or less than the thickness of a conventional coat of nail polish. Preferably, the overall thickness of the capacitive device is less than about 0.05 inches, and more preferably less than about 0.01 inches, even more preferably less than about 0.003 inches. Optionally, one or more top coats are applied to protect the conductive top layer. Preferably the top coat is sufficiently conductive such that an effective amount of charge can be transferred in order to provide useful input through a capacitive touchscreen using a fingernail.

Also disclosed is a capacitive fingernail system adapted to fit on a fingernail, comprising: a conductive base layer that is adapted to be secured to a fingernail; a dielectric medium on top of the conductive base layer; and a conductive top layer that is located on top of the dielectric medium. The capacitive fingernail system is designed with sufficient capacity that it can store an amount of charge to permit the fingernail to successfully and effectively interact with a capacitive touchscreen. The conductive base layer may comprise a first metallic foil shaped to fit on a fingernail. Optionally, the first metallic foil is shaped to cover a distal portion of the fingernail. The conductive top layer may comprise a second metallic foil which is shaped to cover a distal portion of the fingernail. Generally speaking, it is preferred that the overall thickness of the capacitive nail system be about the same or less than the thickness of a conventional artificial nail, and even more desirable that it be about the same or less than the thickness of a conventional coat of nail polish. Preferably the capacitive nail system is formed such that the overall thickness is less than about 0.05 inches, and more preferably, less than about 0.01 inches, and even more preferably, less than about 0.003 inches. At least one of the conductive base layer and the conductive top layer may comprise a layer that was formed using conductive ink. Optionally, the system may further include one or more conductive top coats applied to protect the conductive top layer. Preferably, the dielectric medium is applied at a thickness that permits storage of enough capacitance to successfully interact with a capacitive touchscreen. The system may further utilize an epoxy to secure the capacitive fingernail system to a fingernail. Alternatively, and/or in addition, the capacitive fingernail system may be secured to the fingernail as a fingernail extension.

Also disclosed herein is a method of using a finger nail to effectively engage with a capacitive touchscreen, comprising: forming a capacitive storage system on a finger nail; touching the finger nail to the capacitive touchscreen to deliver an effective amount of energy to engage the touchscreen.

Also disclosed herein is a method of using a finger nail to effectively engage with a capacitive touchscreen, comprising: forming a capacitive storage system on a finger nail; touching the finger nail to the capacitive touchscreen to receive an effective amount of energy to engage the touchscreen.

Also disclosed herein is a kit for forming a capacitive finger nail system, comprising at least one capacitive storage device that is sized and shaped to be secured to a fingernail system. The kit may further comprise an adhesive material to secure the capacitive storage device. The kit may also include one or more compositions that can be applied to form protective layers on top of the capacitive storage device. The capacitive storage device may be included in the form of component parts, including, for example, a first conductive plate that is shaped to be secured to a surface of a finger nail; a dielectric medium to be applied on top of the first conductive plate; and a second conductive plate that is shaped to be secured on top of the dielectric medium. The second conductive plate may be about the same size or larger in surface area than an area occupied by the dielectric medium, but to the extent that it is larger than the dielectric, a nonconductive layer may need to be formed between the first and second conductive plates to prevent the two plates from contacting each other and shorting out the electrical circuit that would otherwise be formed. Optionally, the kit may include a software driver that can be used to reprogram the processor for the touchscreen device in order to recognize and process the shapes that will likely be registered when a user contacts a capacitive touchscreen with a fingernail. The driver may take the form of instructions and/or data to be used by the processor associated with the user's touchscreen device in order to process shapes and patterns specific to fingernails.

Also disclosed herein is a fingernail system for use with a capacitive touchscreen, comprising: a shaped conductive device that is pre-formed so that it can be secured to a curvature of a fingernail. The shaped conductive device preferably has at least one conductive surface intended to be pressed on a surface of a capacitive touchscreen, and the at least one conductive surface has sufficient conductivity such that the shaped conductive device transfers an effective amount of electrical energy to cause a change in capacitance at a location on the capacitive touchscreen where the fingernail, to which the shaped conductive device is secured, presses upon the capacitive touchscreen. One or more conductive top layers may be secured on top of the at least one conductive surface. Optionally, the system includes a software driver that provides information to be used by a processor to assist in the recognition and processing of shapes and patterns that are specific to the shaped conductive device.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
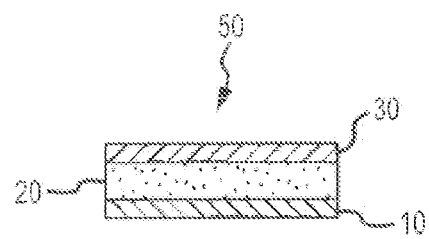
FIG. 1 is an illustration of a basic capacitive storage device.

In addition to their meanings as would be understood by those skilled in the art, the terms below will be construed as indicated:

As used herein the term "adhesive" includes those binding agents which are conventionally used in the nail industry, including glues, epoxy compositions and gel-based compositions. Also, as used herein, the term "polish" refers to any liquid or gel that is applied to the nail and that dries or cures thereafter to form a dry surface. A polish can be clear, tinted, opaque, translucent, metallic, opalescent, shimmering and/or combinations thereof. Polishes and adhesive may be applied using known conventional application techniques and may be subjected to evaporation and/or radiation processes (including curing via visible and ultraviolet light, as well as other known techniques). Once dried or cured, the finish may be matte, shiny or flat.

Layers and films herein may be "secured to" a nail. As used herein, the terms "secured to", "to secure" and other similar such phrases, mean that a layer or film is placed in contact with or applied to a nail in such a manner that the layer or film is contiguous to the nail itself or to a base layer or a top layer, either of which may itself be secured to or existing on the nail. A layer or film may be "secured to" a nail, a base layer, or a top layer even though other matter (such as another base layer or another top layer) intervenes. Accordingly, matter which is "secured to", for example, a nail, need not actually be contiguous to that nail.

As used herein, the term "contiguous to" is intended to convey direct contact. The phrase "one object is be 'contiguous to' a second object" means that one object is secured to directly, or secured such that the one object is in contact with a second object, such that there is essentially no intervening matter between the two objects.

As used herein, the terms "top layer" and "on top of" are intended to convey relative proximity to a nail. That one layer is on "top" of a reference layer means that the one layer is further in proximity to the nail than the reference layer (which may be the nail itself). Unless the context suggests otherwise, however, the term is not intended to convey top-most or the upper-most layer.

Similarly, as used herein, the terms "base" and "base layer" are intended to convey proximity to a nail. That one layer is a base layer relative to another means that the one layer is closer in proximity to the nail than the reference layer. Unless the context suggests otherwise, however, the term is not intended to convey the bottom-most layer.

A detailed description of the present invention will now be described.

Capacitive touchscreens are widely used into day consumer products, and the technology behind them has been described in numerous patents and articles. For example, Hotelling (U.S. Pat. No. 7,663,607 and U.S. Patent Publication No. 20060097991) disclose a touch panel having a transparent capacitive sensing medium configured to detect multiple touches or near touches that occur at the same time and at distinct locations in the plane of the touch panel. The touch panel described in Hotelling monitors changes in capacitive coupling associated with those touch events at distinct points across the touch panel. A change in capacitance typically occurs at a capacitive coupling node when a finger is placed in close proximity to the capacitive coupling node. It can be described that the finger "steals charge" thereby affecting the capacitance. This capacitive touchscreen is typical of what this invention is intended to be used with. The patents referred to above are hereby incorporated by reference in their entirety, including without limitation, those passages that relate to conductive compositions and conductive inks.

While a finger being placed in contact with a capacitive touch screen results in a change in the capacitance being monitored such that a touch event can be identified along with its location, the change (if any) associated with the same user contacting the same capacitive touch screen with a bare fingernail does not result in a sufficient change in capacitance so as to trigger a touch event. The result is that the touchscreen does not recogniZee the touch that occurs when a bare fingernail comes into contact with the touchscreen.

The present invention is intended to permit a user to use a fingernail to effectively engage a touchscreen device by causing a change in capacitance sufficient to trigger a touch event such that the touchscreen reacts to the fingernails contact. In particular, the present invention utilizes a capacitive nail system that when pressed on a touchscreen device, will change the capacitance such that the touchscreen will recognizee a touch event. A detailed description of how to form a capacitive nail system is provided below.

Since capacitors and capacitance are relevant to the present invention, FIG. 1 illustrates the basic aspects of a simple capacitor, and a way in which a capacitor may be formed. A conductive base layer 10 may be initially formed. A layer of dielectric material 20 may then be formed on top of the conductive base layer 10. A conductive top layer 30 may then be formed over the dielectric layer 20 to form a capacitor 50. "Capacitance" is a unit of measure describing the electrical storage capacity of a capacitor. Capacitance is measured in Farads, microFarad (millionth of a Farad), nanoFarad (billionth of a Farad or $10^{-9}$), or in picoFarad (trillionth of a Farad or $10^{-12}$). The amount of energy that can be stored depends on such factors as the surface area of the dielectric substance (A), the dielectric constant (K) associated with the dielectric substance, and the thickness (t) of the dielectric. $C=KA(0.2246)/t$ (0.2246 is a conversion factor in English, and for Metric 0.0884).

A dielectric is a material that has an ability to store electrical energy, and a material's dielectric constant directly relates to the individual capacity to store electrical energy. Capacitors can utilize any dielectrics such as ceramic material, air, or even naturally occurring dielectrics such as mica. The dielectric layer is preferably comprised of one or more materials having a very high dielectric constant and low leakage current characteristics, for example, $SiO_2$ and $Si_3N_4$, with $Si_3N_4$ being typically preferred due to its higher dielectric constant. Other dielectric materials can be used, however, including those dielectric materials that were disclosed in the patents referenced in the preceding paragraph.

Generally speaking, as a dielectric layer is used in connection with the present invention, it is preferred that the overall thickness of the dielectric layer be about the same or less than the thickness of a conventional artificial nail, and even more desirable that it be about the same or less than the thickness of a conventional coat of nail polish. Preferably, the total thickness of the dielectric layer for use in the present invention is less than about 0.02 inches, and more preferably less than about 0.005 inches, and even more preferably less than 0.001 inches. Preferably, the overall thickness of the capacitor used in the present invention is less than about 0.05 inches, and more preferably less than about 0.01 inches, even more preferably less than about 0.003 inches. The presence of additional protective layers, however, may increase the overall thickness of the nail capacitive system.

Capacitors are commonly-used electrical components and are used for storing electrical energy. A capacitor is typically constructed of two conductive plates separated by a non-conductive dielectric layer. The amount of energy that a capacitor may store depends upon factors such as surface area and the dielectric constant of the dielectric material between the plates.

Thin film and ultrathin capacitors and other ultrathin energy storing devices are well known in the art, including methods for manufacturing them. For example, Chow (U.S. Pat. No. 7,295,419) discloses nanofiber surface based capacitors that use nanofibers and nanofiber enhanced suffice areas in various applications and devices. Mosley (U.S. Pat. No. 7,428,138) discloses a capacitor made using carbon nanotubes. Burgener (U.S. Pat. No. 5,973,382) discloses ultrathin capacitors and methods for making them. Jenson (U.S. Pat. No. 7,389,580) discloses ultrathin electrolyte films and dielectric films, and ways to fabricate ultrathin energy-storage devices. Kumar (U.S. Pat. No. 6,912,113) discloses thin film capacitors made using conductive polymers. Kon (U.S. Patent Publication No. 20080089012) discloses a high-energy-density capacitor in a small, ultra-thin, and easily mountable structure. Long (U.S. Pat. Nos. 7,255,924 and 7,672,114) discloses a composite that can be used in making capacitor electrodes and other capacitive structures. Vasudev (U.S. Pat. No. 4,509,990) discloses thin semiconductor-based capacitors and methods for making them. Wang (U.S. Patent Publication No. 20070145525) discloses MIM capacitor structures and methods of manufacturing them. Zheng (U.S. Pat. Nos. 6,704,188 and 8,013,371) disclose ultra-thin capacitor structures and methods for making them. The present invention contemplates use of these and other capacitive technologies. All documents referred to above, including all patents, patent applications, and printed publications, are hereby incorporated by reference in their entirety, including without limitation, those passages that relate to capacitors, capacitive structures and methods for making such capacitors.

Capacitors and other capacitive storage devices for use with the present invention can be made using the technology disclosed in the publications identified and incorporated above relating to capacitor technology. They could also be made using conductive layers using the technology disclosed in the publications identified and incorporated above relating to conductive compositions and conductive materials. Such capacitors could utilize a variety of dielectrics disclosed in the publications identified and incorporated above relating to capacitor technology, and including those specific dielectrics disclosed herein.

Figure 2:
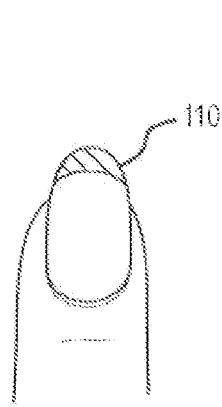
FIGS. 2-4 illustrate a method of creating a capacitive nail system according to one embodiment of the present invention.
Figure 3:
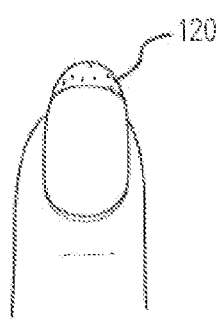
Figure 4:
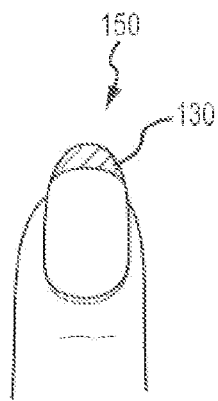

An example of how to create a capacitive nail system in accordance with one embodiment of the present invention will now be described using FIGS. 2-4. A conductive base layer 110 is secured to the fingernail. The conductive base layer 110 may be made of a metallic foil (e.g., made of gold, copper, silver, and/or other conductive metals), and it may be secured using an adhesive or other bonding agent. The metallic foil with a pre-applied adhesive may also be used. Of course, the conductive base layer 110 may be formed of other conductive materials, including, conductive ink, and other liquid, conductive materials that may be dried and/or cured to form a conductive layer. A layer of dielectric medium 120 is then secured on top of the conductive base layer 110. The dielectric medium may be applied in a variety of known ways using known dielectric materials, and it is contemplated that the dielectric medium 120 may even be formed in place. One of skill in the art will appreciate that the surface area of the conductive base layer 110 is adjusted based on the dielectric constant of the dielectric material used to form layer 120, and the thickness of layer 120 to be formed. One of skill in the art will adjust these measures to ensure that the capacitive fingernail system has sufficient capacity to store an effective amount of charge to permit the fingernail to successfully interact with a capacitive touchscreen.

A conductive top layer 130 is then secured on top of the dielectric medium 120 to form a capacitive nail system 150. The conductive top layer 130 may be made of a metallic foil (e.g., made of gold, copper, silver, and/or other conductive metals), and it may be secured using a conductive adhesive or other bonding agent. The metallic foil with a pre-applied adhesive may also be used. Of course, the conductive top layer 130 may be formed of other conductive materials, including, conductive ink, and other liquid, conductive materials that may be dried and/or cured to form a conductive layer. One or more layers of conductive compositions may be applied on top of the conductive base layer 110 prior to the application of the dielectric medium 120. Similarly, one or more layers of conductive compositions may be applied on top of dielectric medium 120 and/or the conductive top layer 130. Moreover, such layers can be applied using any number of known methods, including for example, brushing, spraying, and extrusion. In addition, such layers can be formed using evaporation and/or radiation (including curing via visible and ultraviolet light, as well as other known techniques). While this method illustrates the creation of a capacitive strip at the distal end of the finger nail, other shapes may be used, including, circles, ovals, and other decorative shapes. Optionally, one or more non-conductive layers may be applied to the fingernail, provided, however, that the distal end of the capacitive nail system remains exposed and conductive such that it can effectively engage a capacitive touchscreen.

Figure 5:
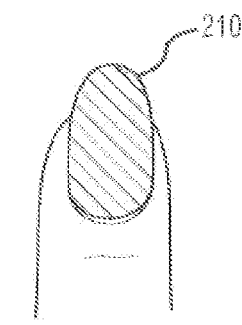
FIGS. 5-7 illustrate a method of creating a capacitive nail system according to another embodiment of the present invention.
Figure 6:
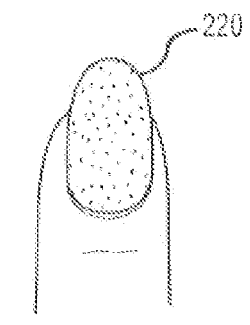
Figure 7:
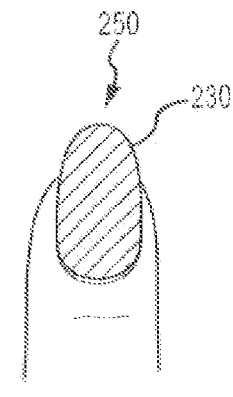

An example of how to create a capacitive nail system in accordance with another embodiment of the present invention will now be described using FIGS. 5-7. A conductive base layer 210 is secured to the fingernail. The conductive base layer 210 may be made of a metallic foil (e.g., made of gold, copper, silver, and/or other conductive metals), and it may be secured using an adhesive or other bonding agent. The metallic foil with a pre-applied adhesive may also be used. Of course, the conductive base layer 210 may be formed of other conductive materials, including, conductive ink, and other liquid, conductive materials that may be dried and/or cured to form a conductive layer. A layer of dielectric medium 220 is then secured on top of the conductive base layer 210. The dielectric medium may be applied in a variety of known ways using known dielectric materials, and it is contemplated that the dielectric medium 220 may even be formed in place. One of skill in the art will appreciate that the surface area of the conductive base layer 210 is adjusted based on the dielectric constant of the dielectric material used to form layer 220, and the thickness of layer 220 to be formed. One of skill in the art will adjust these measures to ensure that the capacitive fingernail system has sufficient capacity to store an effective amount of charge to permit the fingernail to successfully interact with a capacitive touchscreen. Generally speaking, it is preferred that the overall thickness of the dielectric layer be about the same or less than the thickness of a conventional artificial nail, and even more desirable that it be about the same or less than the thickness of a conventional coat of nail polish. Preferably, the total thickness of the dielectric layer for use in the present invention is less than about 0.02 inches, and more preferably less than about 0.005 inches, and even more preferably less than 0.001 inches.

A conductive top layer 230 is then secured on top of the dielectric medium 220 to form a capacitive nail system 250. The conductive top layer 230 may be made of a metallic foil (e.g., made of gold, copper, silver, and/or other conductive metals), and it may be secured using a conductive adhesive or other bonding agent. The metallic foil with a pre-applied adhesive may also be used. Of course, the conductive top layer 230 may be formed of other conductive materials, including, conductive ink, and other liquid, conductive materials that may be dried and/or cured to form a conductive layer. One or more layers of conductive compositions may be applied on top of the conductive base layer 210 prior to the application of the dielectric medium 220. Similarly, one or more layers of conductive compositions may be applied on top of dielectric medium 220 and/or the conductive top layer 230. Moreover, such layers can be applied using any number of known methods, including for example, brushing, spraying, and extrusion. In addition, such layers can be further subjected to evaporation and/or radiation processes (including curing via visible and ultraviolet light, as well as other known techniques). While this method illustrates the creation of a capacitive device that substantially covers the entire finger nail, a capacitive device may be formed using less than substantially the entire fingernail. For purposes of ease of illustration, the conductive base layer 210 and the conductive top layer 230 are illustrated as covering substantially the entire nail surface, but preferably, all layers of the present system will avoid contact with the skin surrounding the fingernail. At most, only one of the conductive base layer 210 and the conductive top layer 230 should be in contact with the skin surrounding the finger nail because skin is conductive, and if both layers were in contact, then little to no electrical energy would be stored in the capacitive device. Optionally, one or more non-conductive layers may be applied to the fingernail, provided, however, that the distal end of the capacitive nail system remains exposed and conductive such that it can effectively engage a capacitive touchscreen. Generally speaking, it is preferred that the overall thickness of the capacitor be about the same or less than the thickness of a conventional artificial nail, and even more desirable that it be about the same or less than the thickness of a conventional coat of nail polish. Preferably, the overall thickness of the capacitor used in the present invention is less than about 0.05 inches, and more preferably less than about 0.01 inches, even more preferably less than about 0.003 inches. The presence of additional protective layers, however, may increase the overall thickness of the nail capacitive system.

Figure 8:
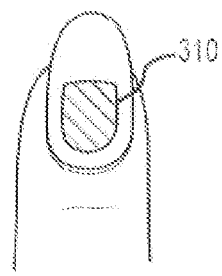
FIGS. 8-11 illustrate a method of creating a capacitive nail system according to another embodiment of the present invention.
Figure 9:
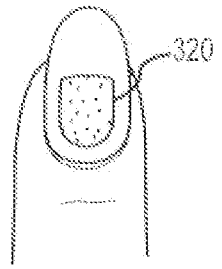

An example of how to create a capacitive nail system in accordance with another embodiment of the present invention will now be described using FIGS. 8-11. A conductive base layer 310 is secured to the fingernail as shown in FIG. 8. The conductive base layer 310 may be made of a metallic foil (e.g., made of gold, copper, silver, and/or other conductive metals), and it may be secured using an adhesive or other bonding agent. The metallic foil with a pre-applied adhesive may also be used. Of course, the conductive base layer 310 may be formed of other conductive materials, including, conductive ink, and other liquid, conductive materials that may be dried and/or cured to form a conductive layer. A layer of dielectric medium 320 is then secured on top of the conductive base layer 310 as shown in FIG. 9. The dielectric medium may be applied in a variety of known ways using known dielectric materials, and it is contemplated that the dielectric medium 320 may even be formed in place. One of skill in the art will appreciate that the surface area of the conductive base layer 310 is adjusted based on the dielectric constant of the dielectric material used to form layer 320, and the thickness of layer 320 to be formed. One of skill in the art will adjust these measures to ensure that the capacitive fingernail system has sufficient capacity to store an effective amount of charge to permit the fingernail to successfully interact with a capacitive touchscreen. Generally speaking, it is preferred that the overall thickness of the dielectric layer be about the same or less than the thickness of a conventional artificial nail, and even more desirable that it be about the same or less than the thickness of a conventional coat of nail polish. Preferably, the total thickness of the dielectric layer for use in the present invention is less than about 0.02 inches, and more preferably less than about 0.005 inches, and even more preferably less than 0.001 inches.

Figure 10:
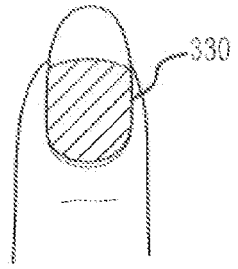
Figure 11:
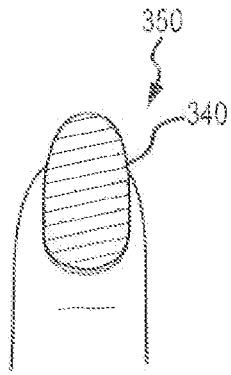

A conductive top layer 330 is then secured on top of the dielectric medium 320 to form a capacitive nail system 350 as shown in FIG. 10. The conductive top layer 330 may be made of a metallic foil (e.g., made of gold, copper, silver, and/or other conductive metals), and it may be secured using a conductive adhesive or other bonding agent. The metallic foil with a pre-applied adhesive may also be used. Of course, the conductive top layer 330 may be formed of other conductive materials, including, conductive ink, and other liquid, conductive materials that may be dried and/or cured to form a conductive layer. While the conductive top layer 330 is illustrated as covering substantially the area occupied by the dielectric medium, a conductive top layer 330 could be utilized that covers not only the area occupied by the dielectric medium 320, but also at least a distal portion of the fingernail (not illustrated). In the case illustrated, however, an additional conductive layer 340 is secured on top of the conductive top layer 330 to form the capacitive nail system 350 as shown in FIG. 11. Optionally, one or more layers of conductive compositions may be applied on top of the conductive base layer 310 prior to the application of the dielectric medium 320. Similarly, one or more layers of conductive compositions may be applied on top of dielectric medium 320 and/or the conductive top layer 330. For ease of illustration, the conductive base layer 310 is illustrating as not making contact with the skin surrounding the fingernail, while the conductive top layer 330 is illustrated as covering substantially the entire nail surface. Preferably, all layers of the present system will avoid contact with the skin surrounding the fingernail. At most, only one of the conductive base layer 310 and conductive top layer 330 (if any) should be in contact with the skin surrounding the finger nail because skin is conductive, and if both layers were in contact, then little to no electrical energy would be stored in the capacitive device. Optionally, one or more non-conductive layers may be applied to the fingernail, provided, however, that the distal end of the capacitive nail system remains exposed and conductive such that it can effectively engage a capacitive touchscreen. Generally speaking, it is preferred that the overall thickness of the capacitor be about the same or less than the thickness of a conventional artificial nail, and even more desirable that it be about the same or less than the thickness of a conventional coat of nail polish. Preferably, the overall thickness of the capacitor used in the present invention is less than about 0.05 inches, and more preferably less than about 0.01 inches, even more preferably less than about 0.003 inches. The presence of additional protective layers, however, may increase the overall thickness of the nail capacitive system.

Figure 12:
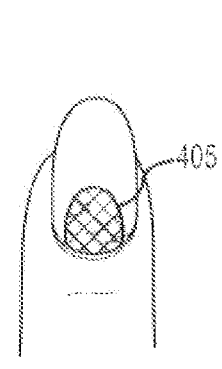
FIGS. 12-14 illustrate a method of creating a capacitive nail system according to yet another embodiment of the present invention.
Figure 13:
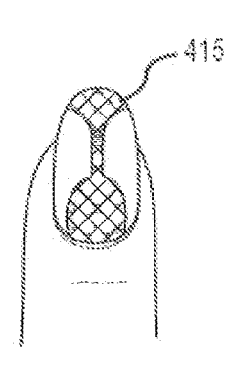
Figure 14:
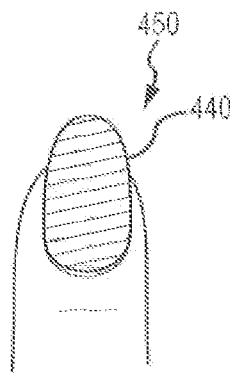
Figure 15:
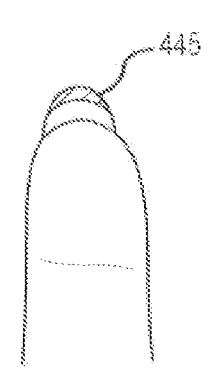
FIG. 15 illustrates the use of an extension in connection a capacitive nail system of the present invention.

An example of how to create a capacitive nail system in accordance with another embodiment of the present invention will now be described using FIGS. 12-15. A capacitive device 405, such as a pre-manufactured capacitor or other electrical energy storing device, is secured to the fingernail as shown in FIG. 12. The capacitive device 405 has a first conductive contact and a second conductive contact, said first conductive contact being secured to the nail using an adhesive or other bonding agent. To form a capacitive fingernail system 450, a conductive top layer 415 is secured to the second conductive contact of the capacitive device 405, which second conductive contact is illustrated in FIG. 13 as being on an upper surface of the device 405. Preferably the conductive top layer 415 extends to the distal end of the finger nail as illustrated in FIG. 13 such that it can effectively engage with a capacitive touchscreen. Optionally, one or more additional conductive top coats 440 are applied to the fingernail on top of the conductive top layer 15 and possibly over the capacitive device 405 as illustrated in FIG. 14. Optionally, as shown in FIG. 15, an additional conductive layer 445 may be applied to the underside of the fingernail, which is in electrical communication with the conductive top layer 415 and conductive top coat 440. While conductive layer 445 is illustrated as covering only a distal portion of the underside of a fingernail, it is contemplated that conductive layer 445 may extend the length of the underside of the fingernail. Preferably, the conductive layer 445 avoids contact with the skin, and thus would stop short of making contact with the skin. In addition, while conductive top layer 415 is illustrated as a single member, it is contemplated that conductive top layer 415 may also comprise a metallic foil located at the distal end of the fingernail in combination with an electrical path that electrically couples the metallic foil and the second conductive contact of capacitive device 405. The capacitive device utilized in this embodiment is selected based on its ability to store sufficient electrical energy to permit the capacitive device to effectively engage a capacitive touchscreen. Generally speaking, it is preferred that the overall thickness of the capacitor be about the same or less than the thickness of a conventional artificial nail, and even more desirable that it be about the same or less than the thickness of a conventional coat of nail polish. Preferably, the total thickness of the capacitive device is less than about 0.02 inches, and more preferably less than about 0.005 inches, and even more preferably less than 0.001 inches.

Figure 16:
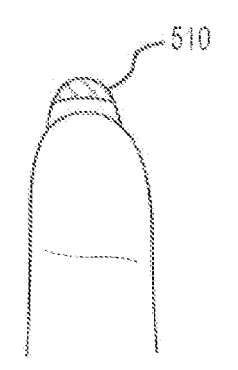
FIGS. 16-18 illustrate a method of creating a capacitive nail system according to yet another embodiment of the present invention.
Figures 17, 18, 19:
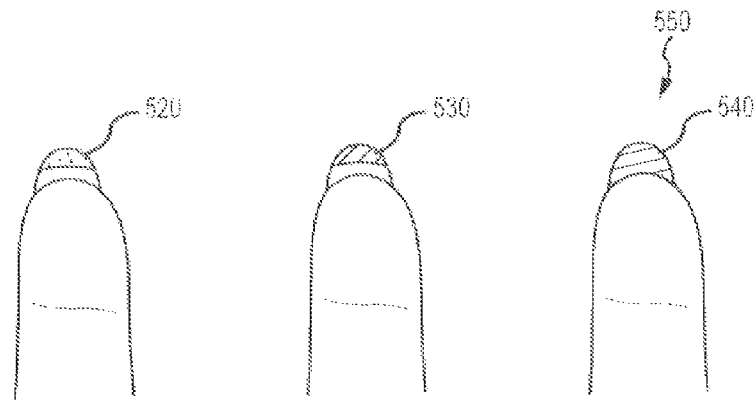
FIG. 19 illustrates the use of a protective coating over a capacitive nail system.

An example of how to create a capacitive nail system in accordance with another embodiment of the present invention will now be described using FIGS. 16-19. A capacitive device 405, such as a pre-manufactured capacitor or other electrical energy storage device, is secured to the fingernail as shown in FIG. 16. The capacitive device 405 has a first conductive contact and a second conductive contact, said first conductive contact being secured to the nail using an adhesive or other bonding agent. To form a capacitive fingernail system 450, a conductive top layer 415 is secured to the second conductive contact of the capacitive device 405, which second conductive contact is illustrated in FIG. 13 as being on an upper surface of the device 405. Preferably the conductive top layer 415 extends to the distal end of the finger nail as illustrated in FIG. 13 such that it can effectively engage with a capacitive touchscreen. Optionally, one or more additional conductive top coats 440 are applied to the fingernail on top of the conductive top layer 15 and possibly over the capacitive device 405 as illustrated in FIG. 14. Optionally, as shown in FIG. 15, an additional conductive layer 445 may be applied to the underside of the fingernail, which is in electrical communication with the conductive top layer 415 and conductive top coat 440. While conductive layer 445 is illustrated as covering only a distal portion of the underside of a fingernail, it is contemplated that conductive layer 445 may extend the length of the underside of the fingernail. Preferably, the conductive layer 445 avoids contact with the skin, and thus would stop short of making contact with the skin. In addition, while conductive top layer 415 is illustrated as a single member, it is contemplated that conductive top layer 415 may also comprise a metallic foil located at the distal end of the fingernail in combination with an electrical path that electrically couples the metallic foil and the second conductive contact of capacitive device 405. The capacitive device utilized in this embodiment is selected based on its ability to store an effective amount of electrical energy to effectively engage a capacitive touchscreen. Generally speaking, it is preferred that the overall thickness of the capacitive device be about the same or less than the thickness of a conventional artificial nail, and even more desirable that it be about the same or less than the thickness of a conventional coat of nail polish. Preferably, the total thickness of the capacitive device is less than about 0.02 inches, and more preferably less than about 0.005 inches, and even more preferably less than 0.001 inches.

Figures 20, 21, 22, 23:
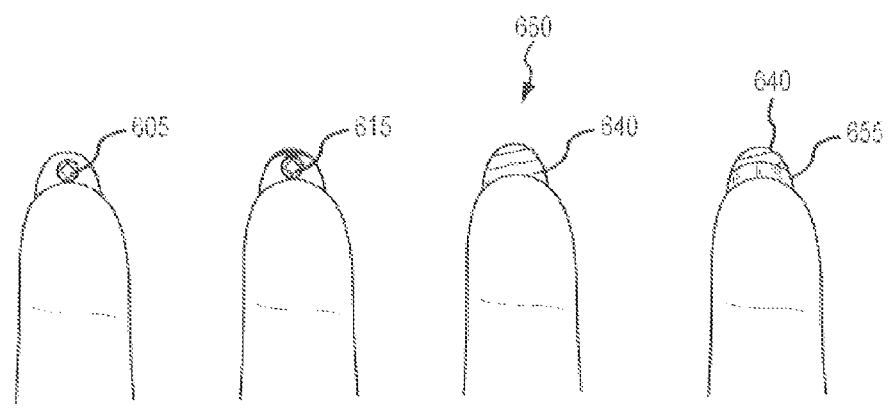
FIGS. 20-22 illustrate a method of creating a capacitive nail system according to yet another embodiment of the present invention.
FIG. 23 illustrates the use of a protective coating over a capacitive nail system.

An example of how to create a capacitive nail system in accordance with another embodiment of the present invention will now be described using FIGS. 20-23. A capacitive device 605, such as a pre-manufactured capacitor or other electrical energy storing device, is secured to the underside of the fingernail as shown in FIG. 20. The capacitive device 605 has a first conductive contact and a second conductive contact, said first conductive contact being secured to the underside of the fingernail using an adhesive or other bonding agent. To form a capacitive fingernail system 650, a conductive top layer 615 is secured to the second conductive contact of the capacitive device 605, which second conductive contact is illustrated in FIG. 21 as being on an upper surface of the device 605. Preferably the conductive top layer 615 extends to the distal end of the finger nail as illustrated in FIG. 22 such that it can effectively engage with a capacitive touchscreen. Optionally, one or more additional conductive top coats 640 are applied to the fingernail on top of the conductive top layer 615 and possibly over the capacitive device 605 as illustrated in FIG. 22. Optionally, as shown in FIG. 23, an additional non-conductive, protective layer 655 may be applied to the underside of the fingernail to cover at least a portion of the underside, but leaving the distal portion of the nail exposed so that it can conduct electrical energy to engage with a touchscreen. The capacitive device utilized in this embodiment is selected based on its ability to store an effective amount of electrical energy to effectively engage a capacitive touchscreen. Preferably, the total thickness of the capacitive device is small enough to fit comfortably under the fingernail, and preferably less than about 0.02 inches, and more preferably less than about 0.005 inches, and even more preferably less than 0.001 inches.

For those embodiments that utilize pre-manufactured capacitive devices, it is preferred that the capacitive device be pre-shaped to incorporate a curved surface that can be easily conformed to the natural curvature of a fingernail. This will facilitate mounting and help ensure the device can be worn comfortably by the user. Conventional semiconductor laminating techniques can be used to form capacitors and other capacitive devices of desired geometries.

It is known that capacitive touchscreens can be programed to take into consideration the size and shape of the area of contact in order to analyze the nature and location of the touch. Thus, it is contemplated that the present invention could be utilized with a software driver that permits the touchscreen device to be reprogramed to better process contact that is registered by using a capacitive nail system of the present invention. Specifically, the software would provide information that would help recognize and process information related to finger nail impressions that are registered on the touchscreen. It is also contemplated that the claimed kits may include a software driver that can be used to reprogram the processor for the touchscreen device in order to recognize and process the shapes that will likely be registered when a user contacts a capacitive touchscreen with a fingernail. The driver may take the form of instructions and/or data to be used by the processor associated with the user's touchscreen device in order to process shapes and patterns specific to fingernails.

Traditional nail coatings can be used in conjunction with the inventions described above. Such nail coatings generally include two types: a traditional polish type, which cures by solvent evaporation; and a polymer type, which cures by chemical reaction and/or radiation (e.g., visible and ultraviolet light). Polymer type materials include, for example, powder/liquid systems, as well as gel systems. Gel systems may utilize a gel that is be brushed onto the nails, cured, and shaped to create lifelike artificial nails. Gel systems are relatively easy to use, take less time for application, are lightweight, have minimal odor, are durable, and may have a high gloss appearance.

Such traditional polish and polymer compositions are well known. For example, Ellingson (U.S. Pat. No. 6,306,375 and U.S. Pat. No. 6,136,300) discloses a variety of nail polish compositions having different surface properties. Ellingson (U.S. Pat. No. 6,123,931) discloses polyurethane and polyacryl nail polish compositions that can be used as coatings for nails as well as methods of use. Farer (U.S. Pat. No. 6,656,483) discloses cosmetic compositions containing polyurethane for application to the skin and nails. Farer (U.S. Pat. No. 6,156,325) and Carrion et al, (U.S. Pat. No. 6,555,096 and related US Patent Publication 20020102222) disclose various enamel compositions for use on nails. Haile (WO2011011304) discloses a variety of curable gel-based nail compositions that can be used as nail coating. Lilley (U.S. Pat. Nos. 6,391,938, 6,599,958 and 6,803,394) discloses a variety of visible and ultraviolet-cured nail coatings that are applied to natural nails and/or artificial nails. Smith et al. (U.S. Pat. No. 6,080,414) discloses films and kits that can be used as polishes for nails. The present invention contemplates use of these and other compositions for use with nails. All documents referred to above, including all patents, patent applications, and printed publications, are hereby incorporated by reference in their entirety, including without limitation, those passages that relate to compositions for use as nail polishes and other nail coatings.

Conductive compositions as referenced above, including conductive compositions for use on the human body are also well known in the art. For example, Jersey-Willuhn (U.S. Pat. No. 7,169,107) discloses various conductive compositions, including conductive adhesives and ink compositions. Conductive materials useful with the present invention can be composed of silver/silver chloride, although other conductive materials may be used including carbon, gold, electrically conductive composites, metallics, conductive polymers, foils, films, and inks. Other suitable conductive materials include wires, platinum, aluminum, silicone rubber conductive materials with nickel-graphite compounds, nanopowders and proteins, graphite conductive wires, and the like. For example, a conductive ink layer which is a silver-based conductor can be cured on an intermediate material that is then secured to the fingernail. Conductive inks are typically silver, gold, and carbon inks composed of thermoplastic polymer-based materials that are screen printed and dried or cured. When the ink is dried and all solvent is removed, the printed area becomes electrically conductive. Cured inks have useful properties of low resistivity and thus high conductivity permitting very low voltage applications, flexibility, and adhesion. If desired, conductive inks are highly adhesive to various substrate materials such as polyester and mylar. Conductive thin films, made for example, using silver nanowires, could also be used to form conductive layers for use in the present invention. Allemand (U.S. Patent Publication No. 20110045272) discloses methods and compositions for producing conductive, thin films of purified nanostructures (e.g., silver nanowires). Jonas (U.S. Pat. No. 5,035,926) discloses conductive polymer compounds and methods for making thin films. The patents referred to above are hereby incorporated by reference in their entirety, including without limitation, those passages that relate to conductive compositions and conductive inks.

It is contemplated that the various top coats that are described herein can be applied in a variety of known ways, including as a polish. The polish can be clear, tinted, opaque, translucent, metallic, opalescent, shimmering and/or combinations thereof. Once dried or cured, the finish may be matte, shiny or flat.

Preferably the inventions described herein, once applied to the nail, will have the appearance of a natural nail or of an aesthetically pleasing ornament applied to a nail. This can be achieved by a variety of ways including flesh-toned colored layers, or by disguising the invention as a decorative feature on the nail, for example, as a decorative decal on the surface of the nail. The capacitive storage device may itself be formed in an aesthetically pleasing shape, such as a symbol or other recognized shape.

In one embodiment, the capacitive nail system is installed upon a distal portion the nail. In another embodiment, the capacitive element of the capacitive nail system is installed upon a proximal portion of the nail with a conductive element at the distal portion of the nail that is in electrical communication with the capacitive element, such that at least a portion of the energy stored in the capacitive system can be detected at the distal portion of the nail. Preferably, the system is installed such that it is spaced a small distance away from the point at which skin contacts the fingernail, in much the same way that a manicurist will stop just short of the skin when applying polish to the nail. In yet another embodiment, the capacitive nail system is installed to cover substantially all of the surface area of the nail.

Optionally, an additional conductive layer may be applied to the side of the fingernail that is opposite the capacitive storage device, which additional conductive layer is in electrical communication with the capacitive storage system. The purpose of this additional conductive layer is to provide an additional contact space on the distal tip of the fingernail so as to improve the ability of the finger nail to effectively engage with the touchscreen.

It is contemplated that the capacitive fingernail systems of the present invention will be charged through ordinary, everyday activity. Where the systems are created, it may be desirable to charge the devices with an effective amount of electrical energy to permit them to immediately be able to interact with a capacitive touch screen. It is also contemplated that the devices when manufactured or created before being installed on a fingernail may also be charged with an effective amount of electrical energy to enable them to interact with a capacitive touch screen immediately after installation on a fingernail. Pre-charging would be particularly useful, for example, when fingernail capacitive systems are sold as part of a kit.

While examples of conductive layers are provided herein, including for example, metallic foils (e.g., made of gold, copper, silver, and/or other conductive metals), and conductive inks, it is contemplated that other conductive materials may be used. Preferably, the conductive materials are flesh-toned in color, and more preferably, the conductive materials are clear so as to appear to be invisible on the wearer's fingernail.

While examples of dielectric mediums are provided herein, it is contemplated that other dielectric mediums may be used. Preferably, the dielectric mediums are flesh-toned in color, and more preferably, the dielectric mediums are clear so as to appear to be invisible on the wearer's fingernail.

While the present invention has been illustrated in connection with a single fingernail, it is contemplated that the present invention could be utilized for one, two, or more of the user's fingers. The benefits of the present invention can be realized by use of the present invention on a single finger of a user.

Although several embodiments of this invention have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A fingernail system for use with a capacitive touchscreen, comprising:
   a shaped capacitance device that is pre-formed so that it can be secured to a curvature of a fingernail, said shaped capacitance device being capable of storing sufficient electrical energy for the fingernail system to engage the capacitive touchscreen;
   said shaped capacitance device having at least one conductive surface intended to be pressed on a surface of a capacitive touchscreen;
   said at least one conductive surface having sufficient conductivity such that the shaped capacitance device transfers an effective amount of electrical energy to cause a change in capacitance at a location on the capacitive touchscreen where the fingernail, to which the shaped capacitance device is secured, presses upon the capacitive touchscreen.

2. The fingernail system of claim 1 further comprising at least one conductive layer secured on top of the at least one conductive surface.

3. The fingernail system of claim 1 further comprising: a software driver that provides information to be used by a processor to assist in the recognition and processing of shapes and patterns that are specific to the shaped capacitance device.

4. A capacitive fingernail system adapted to fit on a fingernail, comprising:
   a. a conductive base layer that is adapted to be secured to a fingernail;
   b. a dielectric medium on top of the conductive base layer; and
   c. a conductive top layer that is located on top of the dielectric medium;
wherein the dielectric medium has sufficient capacity to store an effective amount of charge to permit the fingernail system to successfully interact with a capacitive touchscreen.

5. The capacitive fingernail system of claim 4 wherein the first metallic foil is shaped to cover a distal portion of the fingernail.

6. The capacitive fingernail system of claim 4 wherein the conductive top layer comprises a second metallic foil which is shaped to cover a distal portion of the fingernail.

7. The capacitive fingernail system of claim 4, wherein the capacitive fingernail system has a thickness that is less than about 0.05 inches.

8. The capacitive fingernail system of claim 4, wherein the capacitive fingernail system has a thickness that is less than about 0.003 inches.

9. The capacitive fingernail system of claim 4 further comprising:
   d. one or more conductive top coats applied to protect the conductive top layer.

10. The capacitive fingernail system of claim 4 wherein the capacitive fingernail system is adapted to be secured to the fingernail as a fingernail extension.

11. The capacitive fingernail system of claim 4 further comprising: a software driver that provides information to be used by a processor to assist in the recognition and processing of shapes and patterns that are created when a fingernail makes contact with a capacitive touchscreen device.

12. A method of creating a capacitive system on a fingernail, comprising:
   a. securing a capacitive device to the fingernail, said capacitive device having a first conductive contact and a second conductive contact;
   b. applying a conductive top layer that is in electrical communication with the second conductive contact.

13. The method of claim 12 further comprising:
   c. applying one or more conductive top coats to protect the conductive top layer.

14. The method of claim 13 wherein the step of applying a conductive top layer comprises:
   i. securing a conductive foil to the fingernail using an adhesive; and
   ii. creating an electrical path between the conductive foil and the second conductive contact to ensuring that the conductive foil is in electrical communication with the second conductive contact.

15. The method of claim 14 wherein the step of creating an electrical path is achieved by locating the conductive foil such that it makes physical contact with the second conductive contact.

16. The method of claim 14 wherein the step of creating an electrical path is achieved by applying a conductive medium that extends from the conductive foil to the second conductive contact.

17. The method of claim 12 further comprising:
   d. applying a conductive base layer on the fingernail such that the first conductive contact of the capacitive device is in electrical communication with the conductive base layer.

18. The method of claim 12 wherein the capacitive device has a thickness that is less than about 0.01 inches.

19. The method of claim 12 wherein the capacitive device has a thickness that is less than about 0.003 inch.

* * * * *